Nov. 11, 1958   R. H. HODGES   2,860,003
INFLATABLE CRASH PROTECTOR FOR VEHICLES
Original Filed June 8, 1953

Robert H. Hodges
INVENTOR.

BY *Clarence A. O'Brien*
*and Harvey B. Jacobson*
Attorneys

United States Patent Office 2,860,003
Patented Nov. 11, 1958

2,860,003

INFLATABLE CRASH PROTECTOR FOR VEHICLES

Robert H. Hodges, Columbia, S. C.

Original application June 8, 1953, Serial No. 360,122, now Patent No. 2,755,125, dated July 17, 1956. Divided and this application July 10, 1956, Serial No. 597,025

3 Claims. (Cl. 296—84)

This invention relates to a safety device for the protection of passengers in vehicles and is especially adapted for use in automobiles, aircraft, and like means of transportation whereby upon an accident or other casualty a protective resilient barrier is provided so as to protect an occupant of the vehicle from serious injury.

The construction of this invention features the use of a container of compressed air having inertia responsive means for opening the container so as to inflate a resilient inflatable member, the inflatable member acting as a cushion or pillow so as to eliminate the possibility of injury to the occupant of an automobile or like vehicle caused by striking a hard unyielding surface in front of them due to the effect of the laws of inertia upon the occupant's body.

It is well known that all structures are responsive to the laws of inertia based, of course, on the recognized formula of force being equal to the mass of the body affected and multiplied by the acceleration or deceleration thereof. Further, it is well known that the distance travelled is equivalent to one-half the acceleration times the square of the time involved. It is the concept of this invention to provide an inertia actuating means consisting of a mass at the end of a lever arm for providing sufficient force to open a closure element to thereby release gas to inflate a cushion, the distance that the weight is required to move being much less than the distance required of the body of the occupant to move therefore requiring considerably less time to complete its function allowing the compressed gas to fully escape in time to protect the occupant of the vehicle from injury.

It is expected to utilize this invention on the dashboard or instrument panel of an automobile or like vehicle, the invention being especially adapted to conform to the general interior decor of the vehicle to thereby provide an unobtrusive and pleasing appearance comparable to the resilient padding now used on vehicles yet which is much more efficient in providing protection for the occupant of the vehicle. It is further expected to use this device on various portions of the vehicle so as to protect both the passengers in the rear portion of the vehicle as well as in the "death seat" to the right of the operator of the vehicle or in fact the operator himself.

Still further objects and features of this invention reside in the provision of a crash protector which is comparatively simple in construction and manufacture, that is selective of the degree of deceleration caused by impact during a collision from that occuring during normal operation of the brakes of the vehicle, which is easy to install, and which requires almost no maintenance yet which will be continuously ready for emergency use.

These, together with the various ancillary objects and features of the invention which will become apparent as the following description proceeds, are attained by this inflatable crash protector, preferred embodiments of which have been illustrated in the accompanying drawings, by way of example only, wherein.

Figure 1:
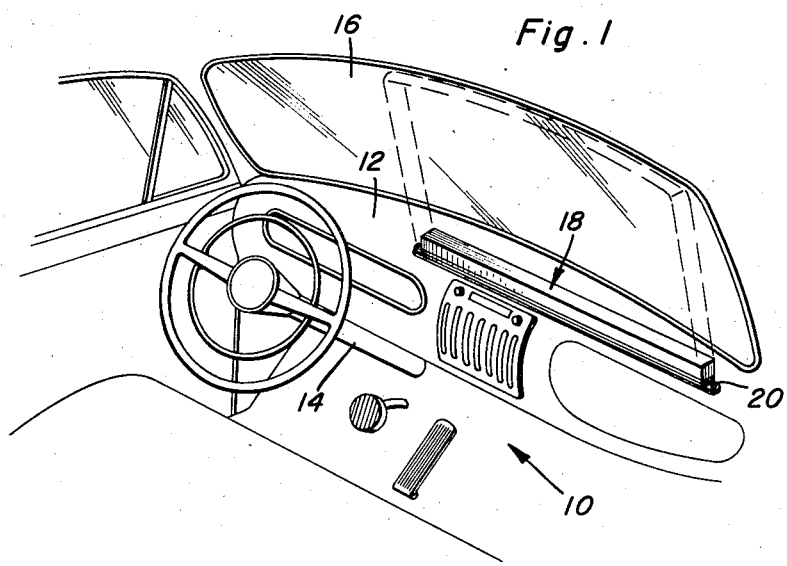
Figure 1 is a perspective view showing the invention as installed as an attachment on the dashboard or instrument panel of a conventional automobile.
Figure 2:
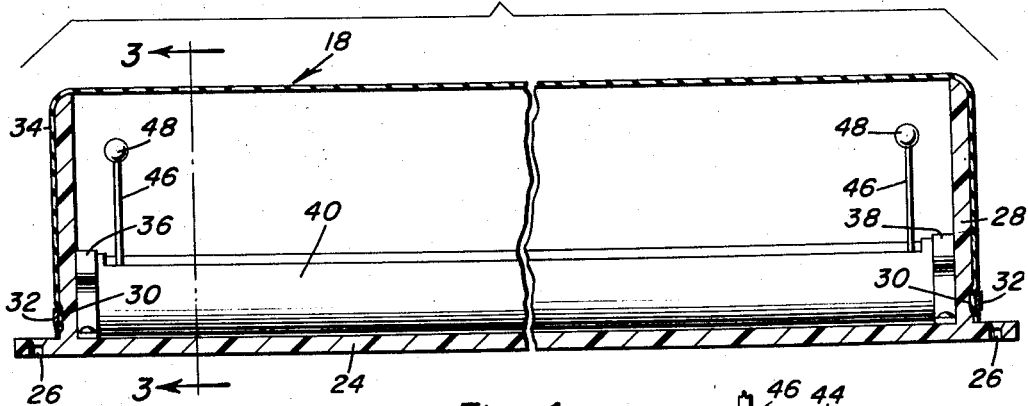
Figure 2 is a vertical sectional view of the crash protector as is shown in Figure 1 illustrating the construction of the device in greatest detail.
Figure 3:
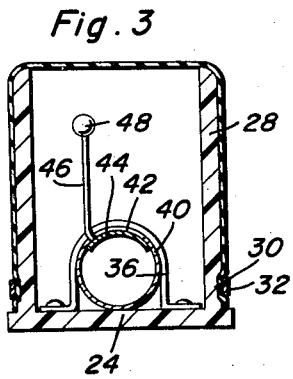
Figure 3 is a vertical sectional view as taken along the plane of line 3—3 in Figure 2.

This application relates to subject matter divided from the application of Robert H. Hodges, Serial No. 360,122, now Patent No. 2,755,125, filed June 8, 1953, for Inflatable Crash Protector for Vehicles.

With continuing reference to the accompanying drawings wherein like reference numerals designate similar parts throughout the various views, reference numeral 10 generally designates a conventional automobile provided with an instrument board 12, a steering column with a steering wheel 14 and a windshield 16. The device comprising the present invention is generally indicated at 18 and may be secured to the instrument panel 20 by suitable screws or other fastening means. Further, the invention may be disposed in a recess or cavity formed in the instrument panel and this crash protector may be factory installed.

The crash protector 18 includes a base 24 having apertures 26 therethrough through which the screws or fasteners 20 extend. The base 24 together with the retaining or side walls 28 thereof are integrally formed from a suitable material such as any of the synthetic plastic resins. The side walls 28 are provided with a peripheral groove 30 therein adjacent the base 24. A retaining band 32 formed from metal or other suitable material is positioned over a resilient flexible inflatable covering 34 and holds the covering 34 sealed in the recess 30 in gas-tight relationship. Clampingly secured to the base 24 by means of clamp elements 36 and 38 which are of substantially inverted U-shape is a cylindrical container 40 having an elongated slot 42 in the upper portion thereof forming an opening. The container 40 is filled with a suitable compressed gas, such as carbon dioxide, or air which would be readily capable of being placed in the container 40. An arcuate inner plate 44 is positioned against the sides of the container 40 and underlies the slot 42. The plate 44 forms a closure member and is held in position by the force exerted by the compressed gas thereon. Obviously, the plate 44 is initially held in position during the filling of the container 40 by other means. The container 40 may, of course, be filled through any suitable aperture formed therein which aperture may be closed as by welding or other sealing means. The plate 44 has a lever 46 attached thereto and rising upwardly therefrom, the lever 46 having a spherically shaped weight 48 at the free end thereof. It is noted that a pair of the levers 46 may be utilized on either end of the container 40 and likewise a pair of weights 48 are secured to the pair of levers 46.

Figure 4:
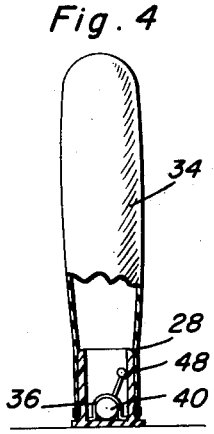
Figure 4 is a vertical sectional view of the device shown in an inflated position.

During normal operation of the car when the brakes are applied a force exerted upon the roads 46 by the weights 48 are not enough to overcome the frictional components of the force exerted by the gas pressure against the plate 44 and hence the container 40 remains sealed. However, when the acceleration or deceleration is increased to many times the force of gravity as would happen during a collision the weight 48 will quickly remove to tear the plate 44 free from its closed position overlying the opening 42 thereby almost instantaneously inflating the resilient covering 34. The final position of the device is shown in Figure 4.

It is to be understood that the covering 34 is of such form that when inflated it will protect the passenger from hitting the instrument panel 12 or the windshield 16. Likewise, the device may be attached overhead to protect the head of an occupant from hitting the top of a car and may optionally be formed in conjunction with the steering wheel so as to prevent the operator from being subject to internal injuries usually a result of serious accidents.

Figure 5:
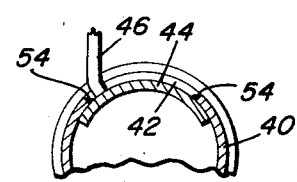
Figure 5 is a sectional detail view of another form of the invention employing sealing means.

In addition to the compressed gas pressure for holding the plate 44 in position, as is shown in Figure 5 suitable sealing means such as solder or the like indicated at 54 may provide a gas tight seal. This solder may be readily frangible when the device is subject to a precalculated acceleration.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An inertia actuated crash protector for vehicles comprising a hollow frame, a resilient inflatable covering on said frame, the edges of said covering being sealed to said frame, a container of compressed gas in said frame, an opening in said container, a closure member in alignment with said opening, and inertia responsive means connected to said closure member for removing said closure member from alignment with said opening to permit said compressed gas to inflate said covering, said container being cylindrical in shape, said opening comprising an elongated slot in said container, said closure member comprising an arcuate plate underlying said opening and held in position by said compressed gas.

2. The crash protector of claim 1 wherein said inertia responsive means includes elongated levers each attached at one end thereof to said closure member, and weights attached to the free end of said levers.

3. The crash protector of claim 1 including sealing means engaging said arcuate plate and said container further maintaining said arcuate plate in position.

References Cited in the file of this patent

UNITED STATES PATENTS

| | | |
|---|---|---|
| 2,499,993 | Gregg | Mar. 7, 1950 |
| 2,649,311 | Hetrick | Aug. 18, 1953 |
| 2,755,125 | Hodges | July 17, 1956 |

FOREIGN PATENTS

| | | |
|---|---|---|
| 896,312 | Germany | Nov. 12, 1953 |